United States Patent [19]
Ryder

[11] 3,937,609
[45] Feb. 10, 1976

[54] METHOD AND APPARATUS FOR MOLDING MATERIALS

[76] Inventor: Leonard B. Ryder, 5 Sharon Drive, Whippany, N.J. 07981

[22] Filed: Aug. 20, 1974

[21] Appl. No.: 498,959

[52] U.S. Cl. .......................... 425/210; 425/242 R
[51] Int. Cl.² ......................................... B29C 1/00
[58] Field of Search ....... 425/73, 74, 210, 225, 326; 264/34, 37; 62/92, 93, 94

[56] References Cited
UNITED STATES PATENTS

| | | | |
|---|---|---|---|
| 2,162,158 | 6/1939 | Coey | 62/94 |
| 3,119,673 | 1/1964 | Asker et al. | 62/94 |
| 3,124,083 | 3/1964 | Atwood | 425/210 |
| 3,662,048 | 5/1972 | Turner | 425/326 |
| 3,789,093 | 1/1974 | Bose | 264/37 |

*Primary Examiner*—Francis S. Husar
*Assistant Examiner*—R. J. Charvat
*Attorney, Agent, or Firm*—D. Laurence Padilla

[57] ABSTRACT

An improvement in the method of operating a molding apparatus as well as an improved apparatus for use in molding plastic and other materials is provided. The inner mold surfaces of the apparatus are flooded, during operation, with a dehumidified gas such as dry air to minimize condensation of moisture onto these surfaces. The dry air is supplied to a chamber surrounding one half of the mold and through channels in the mold onto the molding surfaces. This dry air forms a field in the area of the mold surfaces to keep out the normally moist ambient air. The field is exhausted through a chamber surrounding the other mold half and recirculated to the supply source where it is regenerated and returned to the first chamber. In this way, a continuous concentration of dry air is maintained in contact with the mold surfaces. One or more dry air curtains are established around the dry air field to prohibit moist air from entering the field.

12 Claims, 6 Drawing Figures

12 # METHOD AND APPARATUS FOR MOLDING MATERIALS

FIELD OF INVENTION

This invention relates to a method and apparatus for molding materials and more specifically, to a method and apparatus for providing a dehumidified air field and a dehumidified air curtain surrounding the area of mold surfaces in an extrusion blow molding or injection blow molding apparatus.

DESCRIPTION OF PRIOR ART

Blow molding of plastics to form containers of various shapes for a wide number of industries has fast become the most conventionally acceptable method of forming plastic containers of all kinds. In a typical injection blow molding apparatus, a plastic parison which has been formed over a core rod is positioned between mold sections of a desired configuration, air is introduced through the internal portion of the core rod and the parison is blown outwardly away from the core rod and against the internal surfaces of the mold sections. The blown article is shaped and cooled by its contact with the inner mold surfaces. After sufficient cooling, the molds are opened and the core rod with the blown container is moved to a stripping station where the container is removed from the core rod. While this particular method and others of the same general type have been found to be fairly commerically feasible, there are a wide number of problems remaining to make this and similar methods most economical in producing the highest quality product.

One of the important factors in determining a high production rate using a process of this type is to obtain the lowest feasible mold temperature during the molding and cooling step. Generally, speaking, the lower the mold temperature, the faster is the rate of heat removal from the plastic and therefore the higher the production rate of the products through the apparatus. In the present state of the art the lowest level to which the mold surface temperatures could be reduced is governed by ambient air conditions in contact with the mold surfaces. In cooler winter climates the moisture content of the air (dew point) is sufficiently low to permit operation at mold temperatures in the 40°–50°F temperature range without having moisture condense out of the air and onto the inner surfaces of the mold. Condensation of moisture on the inner mold surfaces is referred to conventionally as "mold sweating". If such mold sweating occurs to an objectionable degree, the part being molded will have surface defects. Naturally, in the more humid, hotter climate areas this particular problem is a more difficult one to overcome because of the higher air moisture content. In this type of climate the lowest practical mold temperatures are usually in the 60°–70°F range.

There have been a number of attempts made in the industry to eliminate mold sweating as an impediment to high production rates. Efforts such as air conditioning the entire production area in which the mold is operating are only partially successful in eliminating the moisture content from the air in the area of the mold surfaces and more importantly, are not economical in terms of the results achieved. It is the primary object of this invention, therefore, to provide a method and apparatus whereby a concentration of dehumidified gas is provided in the area of the mold surfaces in a practical and economical way so as not to increase the cost of production beyond a certain minimum level.

It is another object of this invention to provide an apparatus whereby a concentration of dehumidified gas is supplied in the area of the mold surfaces and is recirculated through the supply source so as to provide an economical means of eliminating mold sweating.

It is still another broad object of this invention to provide an apparatus and method whereby mold surface temperatures may be maintained at 0°F or below and still not experience any mold sweating.

BRIEF DESCRIPTION OF THE INVENTION

The objects of this invention are satisfied by an apparatus for molding materials especially useful in a blow molding environment in which there is provided a first and second mold section each having a mold surface which is adapted to partially enclose and contact the material to be molded. These sections which are in a desired configuration for providing an end article of a particular shape, are adapted to be joined together to form a unitary mold area at the mold surfaces. One of the mold sections is provided with a casing forming a hollow chamber proximate the mold surface. The chamber has an opening which communicates with the space surrounding the mold surfaces. A gas supply means is connected to the chamber and supplies a continuous stream of dehumidified gas into the chamber under positive pressure. This gas is passed through the opening in the mold section and into the region immediately contiguous with the mold surfaces thereby setting up a dehumidified gas field in contact with the molding surfaces. Supplying a dehumidifed gas through the mold section itself immediately into contact with the mold surfaces enables a concentration of dehumidified gas to be maintained and this allows an economical way of purging the moisture filled air in the vicinity of the mold surfaces during the operation of the mold.

In the preferred embodiment, the other mold section is also provided with a casing having a hollow chamber surrounding the mold surface. This casing is provided with an intake opening proximate the mold surfaces for receiving the dehumidified gas from the gas field and an exit orifice for exhausting the gas from the second chamber. Exhaust means is connected to the second chamber and draws the gas from the gas field through the second chamber. This exhaust means is also connected to the supply source so that the dry gas is returned to the source, reconditioned, and once again supplied to the first chamber. This provides an economical means of supplying a continuously recirculated, recycled dry gas into the region immediately in contact with the mold surfaces. As a result of this, the dew point immediately in the area of the mold surfaces is very low and the mold surfaces may be reduced to a very low temperature without worrying about moisture condensing on the mold surfaces. In order to enhance the supply of dehumidified gas to the dry gas field, a plurality of openings may be provided in the casing of the first mold section to permit the dry air to flow more evenly into the area.

The method and apparatus of the present invention further includes the provision of a continuous stream of dry gas, preferably dry air, to form a curtain surrounding the dry gas field. To accomplish this, an annular slot is placed in the first casing in a position so that it surrounds the molding surface and communicates with the chamber. The slot is therefore positioned about the periphery of the gas field and is substantially in registration with the intake opening in the second casing. The gas supply source and the exhaust means cooperate to pass the dry gas not only out of the openings in the casings into the gas field as above described but also through the annular slot and into the intake opening of the second chamber thereby to form a continuous curtain of dehumidified gas surrounding the gas field. With this construction, a continuous curtain of dry gas is maintained around the gas field to prevent moisture filled air from penetrating into the area of the gas field. As a result, the mold surfaces are further prevented from experiencing condensation during the operation of the mold. For even greater efficiency in the operation of the mold system, a second annular slot is positioned in the first casing surrounding the first annular slot and cooperating with the intake opening of the second casing to provide still another air curtain surrounding the first air curtain. In this construction, a double air curtain is provided around the gas field. Turbulence is avoided when the gas is passed through the annular slots described by forming these slots with arcuate shapes at every substantial change of direction of the slots.

The gas supply source may be any number of a possible dry gas sources. As one example, a conventional air conditioner may be connected to the first chamber and dry air is supplied into the area of the mold surfaces. In this system, the exhaust means may be a conventional return line which connects with the second chamber and draws the dry air from the field through the second chamber and out back to the air conditioner where it is reconditioned and then recirculated back to the first chamber. Also in this system as well as in any other gas supply system, a reheater may be positioned between the air conditioner and the chamber to heat the output flow of air from the air conditioner prior to the entry thereof into the first chamber. The reheater permits the mold surfaces to be maintained at a temperature level much below 40°F and still there will be no condensation of moisture on these mold surfaces. Since the dew point of the dry air coming from the air conditioner is normally such that condensation will occur at 40°F, heating the dry air to a temperature of up to 120°F means that there will not be any possibility of this heated dry air being lowered to below 40°F as it passes onto the mold surfaces since the time of passage through the system is so rapid. As a result, the mold surfaces may be maintained at a temperature much below 40°F and no mold sweating will occur.

Still another supply of dry gas which is capable of reducing the dew point to as much as minus 40°F is a system including desiccant dryers utilizing absorbents such as molecular sieves. Other desiccant systems employing materials such as silicon gel or activated alumina are also quite successful in a system of this type. Since a system of this type is capable of reducing the dew point of the dry gas supplied to as much as minus 40°F, the mold operating temperatures can also be lowered to this same temperature range and higher production rate is therefore possible due to the faster cooling of the plastic in the mold. Still other gas supply sources are possible in the apparatus of the invention. As another example, the use of sub zero air supplied by special industrial refrigeration equipment which dries air to sub zero temperatures by freezing rather than condensation permits dry air to be supplied at a dew point as low as minus 65°F.

The objects of the invention will become more apparent from the following detail description taken in conjunction with the accompanying drawings in which.

DETAIL DESCRIPTION OF THE DRAWINGS

Figure 1:
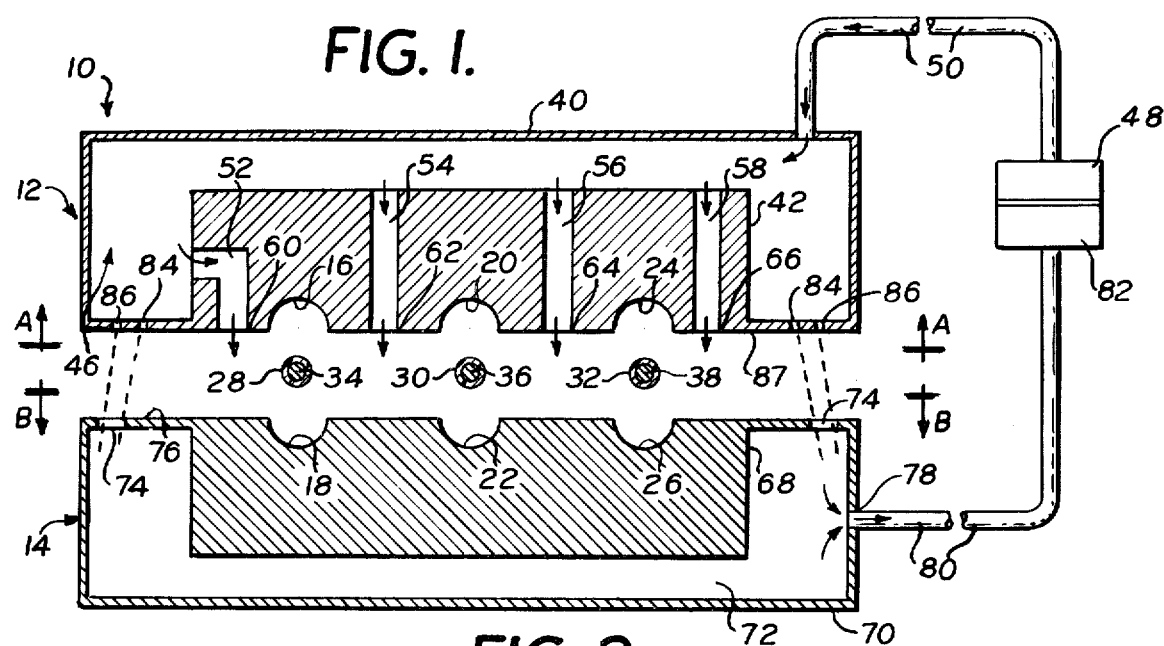
FIG. 1 is an elevational view in section of the molding apparatus of the invention.

Referring now to FIG. 1, there is illustrated generally by the numeral 10 a molding apparatus useful in molding material such as plastic. The apparatus 10 is shown to have two molding sections 12 and 14 in a spaced apart position. Each of the molding sections 12 and 14 are shown having molding surfaces 16 and 18 oppositely positioned from each other and adapted when the mold sections are joined together to form a singular mold area at the molding surface. FIG. 1 also shows other cooperating mold surfaces 20 and 22 and 24 and 26 which similarly join together to form a mold area. Plastic parisons 28, 30, and 32 are shown in position just prior to the mold sections closing thereupon. These plastic parisons are positioned around core rods 34, 36 and 38 respectively. In the operation of this particular blow molding apparatus, the mold sections 12 and 14 are joined together and the mold surfaces enclose the parisons 28, 30 and 32. Air is then blown through the core rods 34, 36 and 38 and the parisons are expanded into contact with the mold surfaces. The parisons then assume the configuration of the mold surfaces and a container of a desirable structure is formed. The containers are then removed from the core rods at a stripping station (not shown).

Figure 2:
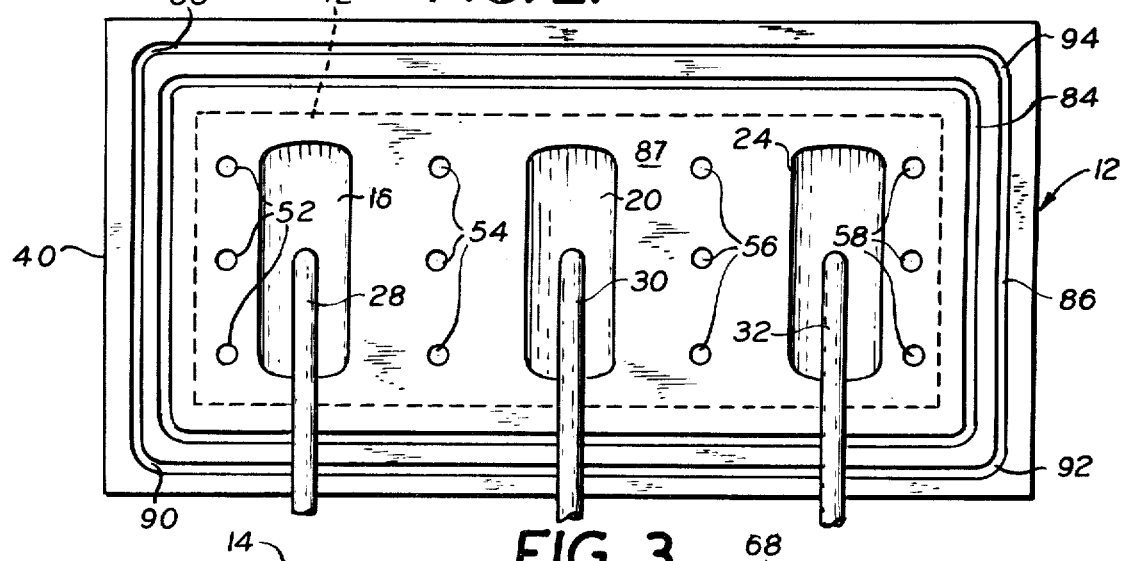
FIG. 2 is a plan view taken on line A—A of FIG. 1 illustrating the upper half of the mold apparatus.

As shown best in FIGS. 1 and 2, the mold section 12 includes a casing 40 and a mold part 42. The mold part 42 includes the molding surfaces 16, 20 and 24 which are the surfaces coming in contact with the parisons and on which mold sweating is to be avoided. The casing 40 defines a hollow chamber 46 surrounding the mold part 42 into which a dehumidified gas such as dry air is fed from supply source 48 through conduit 50. A plurality of channels — 52, 54, 56 and 58 are formed in the mold part 42 and serve to communicate with chamber 46 so as to receive the dry air from the chamber and pass it out of openings 60, 62, 64 and 66 respectively into the area immediately contiguous with the molding surfaces.

In operation, the dehumidified air is passed under positive pressure from source 48 through supply line 50 and into chamber 46. As the dry air is continuously supplied, chamber 46 is filled and the dry air then passes through channels 52, 54, 56 and 58. These channels are formed directly in the mold part 42 so that the dry air floods the area immediately in front of the molding surfaces 16–26 and displaces any moisture filled air in the vicinity thereby setting up a dry air field. The dew point of the dry air is substantially lower than that of moist air and thus the mold surfaces may be brought to a lower temperature because of the high concentration of dry air. To improve the degree of concentration and to improve the movement flow of the dry air, the channels 52, 54, 56 and 58 may be arranged as shown in FIG. 2, that is, a plurality of vertically arranged individual channels all supplying dry air to the dehumidified air field in contact with the molding surfaces.

Figure 3:
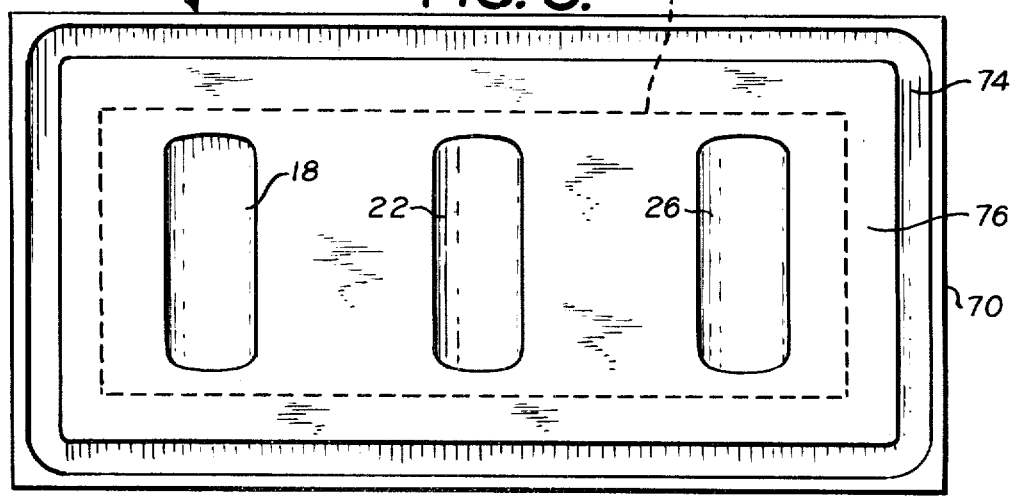
FIG. 3 is a plan view taken on line B—B of FIG. 1 illustrating the other mold section of the apparatus shown in FIG. 1.

The effectiveness of the mold apparatus thus far described is even more enhanced by providing an exhaust system to remove the dry air field so that a continuous flow of a fresh supply can be maintained, a recirculation system to economically recirculate the dry air, and a dry air curtain to surround the air field and further prevent moisture from condensing on the molding surfaces by penetration of moist air into the dry air field. Referring again to FIG. 1, the mold section 14 comprises a mold part 68 which supports the molding surfaces 18, 22 and 26, and a casing 70 which surrounds the mold part 68 and defines a hollow chamber 72. An annular opening 74 (best shown in FIG. 3) positioned in the front face 76 of the casing 70 functions as an intake opening for the dry air to flow into chamber 72. An exit orifice 78 in the casing permits the moving dry air to exit from the chamber and into conduit 80. An exhaust device, such as a fan, blower or the like, illustrated schematically and designated by the numeral 82 draws the dry air under pressure through the cycle just described and also feeds the exhausted dry air to conditioner 48 where it is reconditioned for a return to chamber 46. With this arrangement, a very economical means of preventing mold sweating from occuring in a single mold or in several molds simultaneously is provided, through the use of relatively small quantities of "conditioned" and "recirculation".

As illustrated in FIGS. 1 and 2, a pair of substantially concentrically arranged annular slots 84 and 86 each form an opening in the front face 87 of casing 40 and communicate with chamber 46. These annular slots effectively surround the molding surfaces and the dry air field established as above described. Because they are in communication with the chamber 46, the dry air fed from source 48 also passes out of slots 84 and 86. The velocity of the dry air under pressure is such that the dry air directly crosses the gap between mold sections 12 and 14 and is absorbed into the intake opening 74. The cooperation of the supply pressure and the exhaust pressure causes two streams or curtains of dry air to be formed between slots 84 and 86 and intake opening 74 as shown by the dotted lines in FIG. 1. The double air curtain which is formed substantially reduces the possibility of penetration of outside moist air into the area of the dry air field within the double air curtain. A non-turbulent flow of air to form the air curtains is made possible by rounding the slots 84 and 86 at every substantial change in direction of the slots such as shown by numerals 88, 90, 92 and 94 in FIG. 2. Additionally, the slots 84 and 86 may be slightly offset relative to, although still maintained in substantial registration with, intake opening 74 so that the air curtains formed are in effect sweeping slightly outward so as to also sweep outward moist air attempting to penetrate into the dry air field. It has been determined that the width dimension of the slots may be about 0.08 inches and the velocity of air through these slots may be about 8–10 feet per second for an excellent and continuous curtain to be established. Obviously, more or less air curtains may be used depending upon environmental conditions, economics of the system and other considerations.

Figure 4:
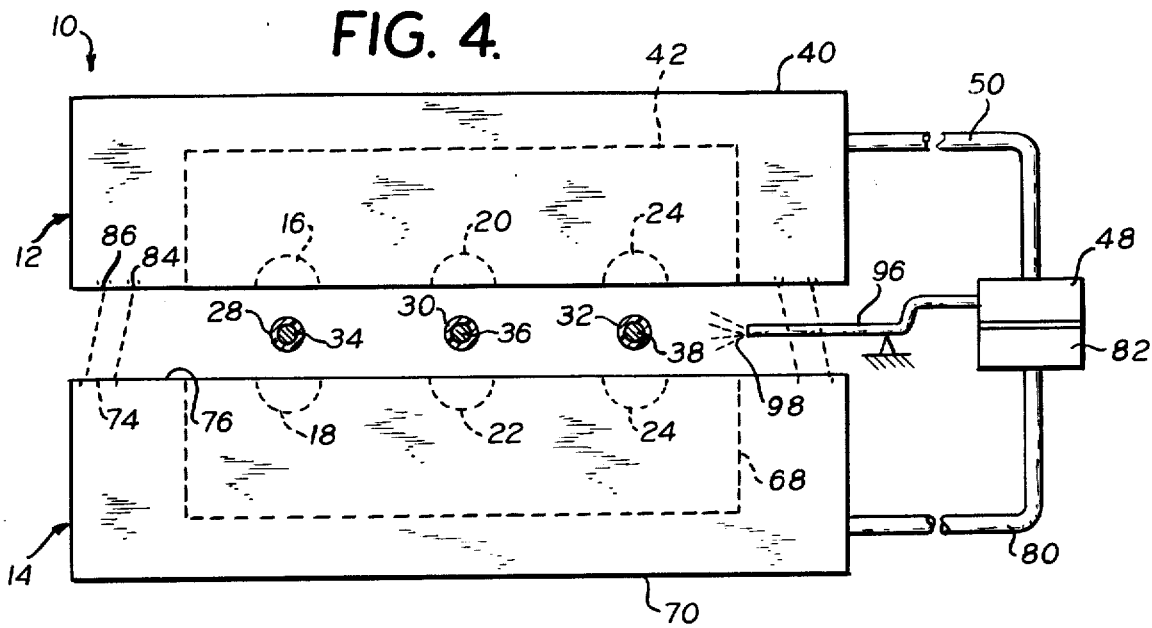
FIG. 4 is an elevational view of another embodiment of the apparatus illustrated in FIG. 1.

Supplying dehumidified gas to the field within the curtains through the mold apparatus has already been described with reference to FIG. 1. Referring to FIG. 4, an alternate manner of supplying dehumidified gas to the dry air field from source 48 is illustrated. A conduit 96 which may be a pipe, hose or other type of gas supply line, is connected directly to the source 48 and penetrates through the double dry gas curtains shown by dotted lines. The end opening 98 on the conduit 96 supplies a stream of dry gas into the area surrounded by the dry gas curtains and thereby establishes the gas field in contact with the mold surfaces. This gas field is vented through opening 74 in casing 70 and is recirculated through the system as described with reference to FIG. 1. Both in this embodiment and that shown in FIG. 1, the dry gas field is swept into opening 74 preferably at a rate of about two field changes per minute within the gas curtains. While only one conduit 96 is shown, any number of such conduits may be similarly connected in the system. With a plurality of such conduits, a heavier concentration of dry gas may be formed within the curtains in a shorter time, thus enhancing the value of the system even more.

Figure 5:
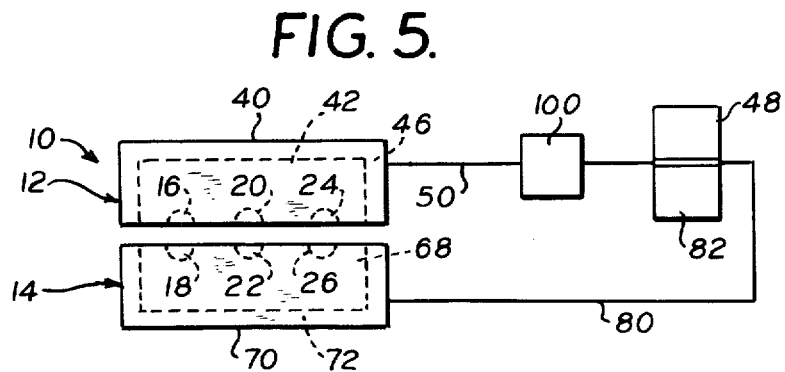
FIG. 5 is a schematic view showing the apparatus of the invention with a particular type of supply source.

The particular source of dry gas or dry air selected may vary depending upon the molding apparatus employed, the environmental conditions and other factors. An excellent and economical source is a conventional air conditioner system with a return duct arrangement connected as shown in the drawings. Since the best dew point temperature obtainable with this type of source is about 40°F, an improved system is provided by the insertion of a preheater 100 as shown schematically in FIG. 5. The preheater 100 heats the dry air flowing from air conditioner 48 to a temperature as high as 120°F if desired before it reaches chamber 46. The mold surfaces 16–26 may be cooled by some cooling means (not shown) to a temperature well below 40°F. The high temperature dry air will be cooled as it passes through the mold apparatus but is not cooled fast enough to lower the temperature of the gas below 40°F before it completely passes through the apparatus. Thus no moisture will condense out and yet the molds are kept at a very cold temperature below 40°F, as desired.

Figure 6:
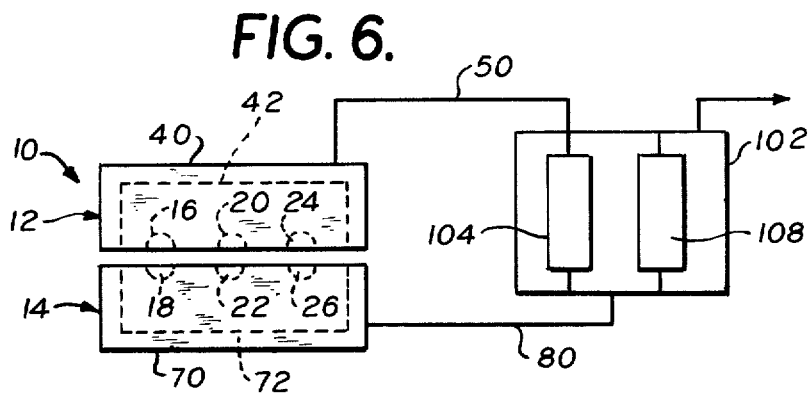
FIG. 6 is another schematic illustration of the apparatus of the invention illustrating another gas supply source.

A particularly good supply source illustrated schematically by the numeral 102 in FIG. 6 is a dryer employing molecular sieve absorbent drying beds or similarly effective desiccants. Several molecular sieve adsorption beds 104, 106 may be employed with associated heating and cooling equipment (not shown) to adsorb moisture from the gas being circulated. One bed can be adsorbing while the other is regenerating. Type 4A LINDE molecular sieve which is the type used for static dehydration in a closed gas system is one example of a suitable desiccant which may be used in the subject invention. The use of a desiccant drying system enables the dew point to be lowered to as much as −40°F thereby permitting the molds to be cooled to that temperature without condensation occuring. Other desiccants such as silica gel and alumina may also be used but molecular sieves are preferred because of their very high capacity for adsorption of water. A typical desiccant dryer 102 is the FOREMOST Dryer manufactured by FOREMOST Machine Builders, Inc. of Fairfield, New Jersey and is described in Bulletin 390-A of that company.

Another supply source which may be used for source 48 in FIG. 1 is a sub zero air refrigeration system which dries air to a sub zero dew point by freezing rather than condensation. Such a refrigeration unit is commercially available from the manufacturer, Peuchen, Inc. of Wilmington, Del. Furthermore, dry bottled gas such as nitrogen or carbon dioxide may also be successfully employed in the present invention.

From the foregoing, it will be appreciated that the apparatus and method of the invention provide an economical solution to increasing production rates in a molding apparatus while simultaneously improving the quality of the product produced. Practically any molding apparatus, particularly those used in the blow molding industry, may be easily modified to incorporate the features of this invention. Injection molding and vacuum forming apparatus may similarly be treated. The subject invention effectively eliminates mold sweating at a small cost and results in a substantial cost saving to the manufacturer through substantial production rate increases.

It will be appreciated that other modifications may be made without departing from the scope of this invention.

What is claimed is:

1. An apparatus for molding materials into a molded form comprising, in combination,
   a. a first mold section and a second mold section, each section having a molding surface adapted to enclose and contact the material to be molded, said mold sections being in a normally spaced apart position when not cooperating to mold a material;
   b. first casing means operatively connected to one of said mold sections and forming a hollow chamber surrounding said molding surface in said one mold section,
   c. slot means in said first casing means surrounding said molding surface and communicating with said chamber,
   d. means to force dry air through said chamber and out of said slot means at a velocity sufficient to maintain dry air curtain around said mold surfaces, and
   e. means to continuously direct dry air into the area of said molding surfaces whereby a dehumidified gas field is maintained in contact with said molding surfaces.

2. The apparatus of claim 1, in which said means for directing dry air comprises a conduit means penetrating said air curtain and having an opening proximate said molding surfaces.

3. An apparatus for molding moldable materials comprising, in combination,
   a. a first mold section and a second mold section each section having a molding surface adapted to at least partially enclose and contact the material to be molded, said sections being adapted to be joined together to form a unitary mold area at said molding surfaces,
   b. a first casing means operatively connected to one of said mold sections and forming a hollow chamber proximate said molding surface in said one mold section, said mold section having an opening positioned in said casing wall near said molding surfaces and communicating with said chamber,
   c. gas supply means operatively connected to said chamber and effective to continuously supply a dehumidified gas into said chamber under positive pressure and to pass said gas out of said opening in said mold section into the region immediately contiguous with said molding surfaces whereby a dehumidified gas field is maintained in contact with said molding surfaces,
   d. second casing means operatively connected to the other of said mold sections and forming a second chamber proximate the other molding surface, said second casing means having an intake opening therein connected to said second chamber for receiving said dehumidified gas from said gas field and an exit orifice for exhausting said gas from said second chamber, and
   e. exhaust means operatively connected to said second casing and to said gas supply means and effective to draw said gas from said field into said intake opening of said second casing and out of said exhaust orifice and to deliver said gas to said supply means for recycling to said first chamber.

4. In the apparatus of claim 3, a plurality of openings in said first casing means proximate said molding surface in communication with said chamber, each opening effective to pass said dehumidified gas from said chamber into said gas field in contact with said molding surfaces, whereby said gas is supplied at a rate sufficient to prevent moist ambient air from entering said gas field and contacting the molding surfaces.

5. The apparatus of claim 3, in which said dehumidified gas is dry air.

6. In the apparatus of claim 3, an annular slot in said first casing means surrounding said molding surface and communicating with said chamber, said slot being positioned at the periphery of said gas field and being substantially in registration with said intake opening in said second casing, said gas supply means and said exhaust means cooperating to pass said gas out of said slot in said first chamber and into said intake opening of said second chamber thereby to form a continuous curtain of dehumidified gas surrounding said gas field.

7. In the apparatus of claim 6, a second annular slot enclosing said first annular slot and communicatng with said chamber, said second slot also being in substantial registration with said intake opening, said gas supply means and said exhaust means cooperating to pass said gas simultaneously out of said first and second annular slots and into said intake opening of said second casing, thereby to form first and second concentric curtains of dehumidified gas surrounding said gas field.

8. The apparatus of claim 7, in which said casing enclosing said slots is arcuately shaped at every substantial change of direction of said slots in the formation of said annular configuration whereby turbulence at said slots is substantially eliminated.

9. The apparatus of claim 7, in which said first and second annular slots have a width dimension of about 0.08 inches and said gas supply means and exhaust means cooperate to provide a velocity to said gas of between about 8 feet per second to about 10 feet per second.

10. The apparatus of claim 3, in which said gas supply means includes desiccant drying means effective to absorb the water content of said dehumidified gas.

11. The apparatus of claim 10 in which said desiccant comprises molecular sieves.

12. The apparatus of claim 3 in which said gas supply means includes means to provide sub zero temperature air.

* * * * *